United States Patent
Ying

(10) Patent No.: US 9,988,026 B2
(45) Date of Patent: Jun. 5, 2018

(54) SYSTEM AND METHOD FOR INDEPENDENTLY CONTROLLING WHEEL SLIP AND VEHICLE ACCELERATION

(71) Applicant: AUTOLIV ASP, INC., Ogden, UT (US)

(72) Inventor: Long Ying, Novi, MI (US)

(73) Assignee: AUTOLIV-NISSIN BRAKE SYSTEMS JAPAN CO., LTD., Ueda-Shi, Nagano-Ken (JP)

(*) Notice: Subject to any disclaimer, the term of this patent is extended or adjusted under 35 U.S.C. 154(b) by 218 days.

(21) Appl. No.: 14/977,919

(22) Filed: Dec. 22, 2015

(65) Prior Publication Data

US 2017/0174192 A1 Jun. 22, 2017

(51) Int. Cl.
*B60T 8/175* (2006.01)
*B60W 30/18* (2012.01)
(Continued)

(52) U.S. Cl.
CPC .............. *B60T 8/175* (2013.01); *B60T 8/172* (2013.01); *B60T 8/1761* (2013.01); *B60T 8/58* (2013.01);
(Continued)

(58) Field of Classification Search
CPC . B60T 8/00; B60T 8/172; B60T 8/175; B60T 8/176; B60T 8/1761; B60T 8/1763;
(Continued)

(56) References Cited

U.S. PATENT DOCUMENTS

| | | | |
|---|---|---|---|
| 4,933,857 A * | 6/1990 | Hashiguchi | B60L 3/10 180/197 |
| 4,940,293 A | 7/1990 | Burckhardt et al. | |

(Continued)

FOREIGN PATENT DOCUMENTS

| | | |
|---|---|---|
| EP | 0240174 A1 | 10/1987 |
| FR | 2799417 A1 | 4/2001 |

(Continued)

OTHER PUBLICATIONS

International Search Report and Written Opinion, ISA/US, corresponding to International Application No. PCT/US2016/060433, dated Jan. 30, 2017.

*Primary Examiner* — Thomas G Black
*Assistant Examiner* — Sara J Lewandroski
(74) *Attorney, Agent, or Firm* — Stephen T. Olson; Harness, Dickey & Pierce, P.L.C.

(57) ABSTRACT

The present disclosure relates to a system for real time control of a wheel slip of each slipping wheel of a pair of wheels associated with an axle of a motor vehicle, simultaneously and independently with real time explicit control of said motor vehicle's acceleration provided by each non-slipping wheel associated with the axle. The system makes use of a total controller and an asymmetric controller associated with the axle of the vehicle for generating two torque signals used to control the total and asymmetric dynamics respectively of the axle, and a distributor for distributing the two said torque signals into available actuators' targets. The two said controllers each contain feedback and feed forward control elements, is operable to sense wheel slippage condition of each wheel on the axle, and augments the feedback and feed forward control based on the sensed wheel slippage conditions.

19 Claims, 7 Drawing Sheets

(51) Int. Cl.
 *B60T 8/172* (2006.01)
 *B60T 8/1761* (2006.01)
 *B60T 8/58* (2006.01)
(52) U.S. Cl.
 CPC .... *B60W 30/18172* (2013.01); *B60T 2250/04* (2013.01)
(58) Field of Classification Search
 CPC .... B60T 8/1764; B60T 8/1766; B60T 8/1769; B60T 8/26; B60T 8/32; B60T 8/52
 See application file for complete search history.

(56) References Cited

U.S. PATENT DOCUMENTS

| | | | |
|---|---|---|---|
| 4,981,190 A * | 1/1991 | Nakayama | B60K 23/0808 180/197 |
| 5,002,148 A | 3/1991 | Miyake et al. | |
| 5,015,043 A | 5/1991 | Resch | |
| 5,026,124 A | 6/1991 | Resch | |
| 5,103,928 A * | 4/1992 | Danner | B60T 8/175 180/197 |
| 5,137,105 A | 8/1992 | Suzuki et al. | |
| 5,261,730 A | 11/1993 | Steiner et al. | |
| 5,519,617 A | 5/1996 | Hughes et al. | |
| 6,059,065 A | 5/2000 | Takeda et al. | |
| 6,549,840 B1 | 4/2003 | Mikami et al. | |
| 2002/0198646 A1 | 12/2002 | Bedner et al. | |
| 2003/0130782 A1 | 7/2003 | Check et al. | |
| 2004/0176899 A1* | 9/2004 | Hallowell | B60K 6/52 701/84 |
| 2009/0024294 A1* | 1/2009 | Ishida | B60T 8/175 701/87 |
| 2009/0107747 A1 | 4/2009 | Luehrsen et al. | |
| 2009/0255746 A1* | 10/2009 | Boesch | B60K 6/365 180/197 |
| 2010/0161188 A1 | 6/2010 | Turski et al. | |
| 2010/0211278 A1 | 8/2010 | Craig et al. | |
| 2011/0209521 A1* | 9/2011 | Shiozawa | B60L 3/102 73/9 |
| 2014/0379220 A1* | 12/2014 | Lee | B60W 30/18172 701/42 |
| 2015/0203117 A1* | 7/2015 | Kelly | B60K 31/02 701/91 |
| 2015/0298666 A1* | 10/2015 | Liu | B60T 8/175 701/74 |
| 2016/0090095 A1* | 3/2016 | Momose | B60W 30/18172 701/83 |
| 2017/0057515 A1* | 3/2017 | Kelly | B60T 8/172 |
| 2017/0137027 A1* | 5/2017 | Farahani | F16H 61/662 |
| 2017/0158201 A1* | 6/2017 | Fairgrieve | F16H 61/0213 |

FOREIGN PATENT DOCUMENTS

| | | |
|---|---|---|
| GB | 2277813 A | 11/1994 |
| IT | 1239158 B | 9/1993 |
| IT | 1239159 B | 9/1993 |
| IT | 1240751 B | 12/1993 |
| IT | 1254131 B | 9/1995 |
| JP | H03213638 A | 9/1991 |
| JP | H1044801 A | 2/1998 |
| SE | 505085 C2 | 6/1997 |
| WO | 03024758 A1 | 3/2003 |
| WO | 2007074718 A1 | 7/2007 |
| WO | 2007107576 A1 | 9/2007 |

\* cited by examiner

Table 1

| Control Region | Total Controller | | Asym. Controller | |
|---|---|---|---|---|
| | Feedback | DTM | Feedback | DTM |
| both wheels stable | Off | On | Off | On |
| both wheels slipping | On | Off | On | Off |
| one wheel stable | On | On | On or Off * | On |

* On: if for the dynamics of Eq. 6, $\dot{\omega}_A$ is controllable via $(-T_{BL}+T_{BR})$
  Off: if for the dynamics of Eq. 6, $\dot{\omega}_A$ is not controllable via $(-T_{BL}+T_{BR})$

FIGURE 7

SYSTEM AND METHOD FOR INDEPENDENTLY CONTROLLING WHEEL SLIP AND VEHICLE ACCELERATION

FIELD

The present disclosure relates to systems and method for controlling wheel slip and vehicle acceleration for motor vehicles, and more particularly to a real time system that controls wheel slip of each slipping wheel of a vehicle, while independently and explicitly controlling vehicle acceleration provided by each non-slipping wheel to thus simultaneously improve stability and acceleration of the vehicle.

BACKGROUND

The statements in this section merely provide background information related to the present disclosure and may not constitute prior art.

Historically both ABS (antilock braking system) and TCS (traction control system) implemented in cars and trucks started with the goal of addressing two fundamental tasks: 1) preventing excessive wheel slip for stability and steerability of the vehicle; and 2) maximizing the vehicle acceleration/deceleration potential to meet the operator's driving requirements. (The rest of the disclosure will refer to acceleration/deceleration simply as acceleration with the understanding that acceleration is a mathematical quantity with signs.) Over time many ABS/TCS systems have evolved to include additional requirements in addition to these tasks. For example, when an electronic stability control (ESC) system activates, a wheel may need to be controlled to a large slip target to momentarily cause a reduction in lateral force generated by that particular wheel. Another example, during split μ ABS (where "μ" is the coefficient of friction between the vehicle's tires and the road surface), the high μ wheel's braking force must increase in a controlled manner when trying to maximize the vehicle deceleration.

Conventionally, the controllable quantities from available actuators on the vehicle are 1) brake torque for each wheel; and 2) engine torque for the driven axle of the vehicle. These quantities combine to affect the wheel dynamics and vehicle acceleration in a complicated and non-linear manner. For situations involving the ABS system, the effect of the engine can be neglected in most cases, making this mechanism easier to analyze and control. In TCS situations, the engine is always a significant factor, and this complication is unavoidable.

Traditionally it has often been difficult to simultaneously accomplish both the task of wheel slip control and the task of vehicle acceleration control in their respective desirable ways, especially for TCS (because of the above discussed complication).

SUMMARY

In one aspect, the present disclosure relates to a system for real time control of a wheel slip of each slipping wheel of a pair of wheels associated with a first axle of a motor vehicle, simultaneously and independently with real time explicit control of said motor vehicle's acceleration provided by each non-slipping wheel associated with the first axle. The system may comprise a coordinated wheel controller (CWC) subsystem having a first total controller and a first asymmetric controller which are both associated with the first axle, and a distributor subsystem to resolve the coordinated wheel controller subsystem's outputs into targets for the available actuators for the axle.

The first total controller and the first asymmetric controller each further comprise a feedback and a feed forward control element, and are further configured to allow flexible augmentations of the feedback and feed forward elements.

In another aspect, the present disclosure relates to a system for real time control of a wheel slip of each slipping wheel of a pair of wheels associated with a first axle of a motor vehicle, simultaneously and independently with real time explicit control of said motor vehicle's acceleration provided by each non-slipping wheel associated with the first axle. The system may comprise a coordinated wheel controller (CWC) subsystem having a first total controller and a first asymmetric controller, both operating independently of one another and being associated with the first axle. Both the first total controller and the first asymmetric controller have a feedback and a feed forward control element. The system may also include a control deviation module for determining a control region that each wheel is operating in (i.e. whether each wheel is slipping or stable), which is used by the CWC subsystem to facilitate the augmentation of the feedback and feed forward elements of the first total controller and the first asymmetric controller. The control deviation module is also used for calculating wheel speed targets and deviations for both positive slip and negative slip control regions, which are used as inputs to the feedback elements of the controllers' in the CWC subsystem. The system may also include a direct torque management (DTM) subsystem for determining a rate of change of torque outputs from each of the first total controller and the first asymmetric controller that are required to induce a desired rate of change of the vehicle's acceleration. The determined rate of change of torque outputs from the first total controller and the first asymmetric controller are to be used as inputs to the feed forward elements of the controllers. A distributor subsystem may be included, which is responsive to the CWC subsystem for generating drive and brake torque targets for each wheel of the first axle.

In still another aspect, the present disclosure relates to a method for real time control of a wheel slip of each slipping wheel of a pair of wheels associated with a first axle of a motor vehicle, simultaneously and independently with real time explicit control of said motor vehicle's acceleration provided by each non-slipping wheel associated with the first axle. The method may comprise using a first total controller associated with the first axle of the vehicle for generating a torque signal $T_{TC}$ based on an augmentation of the controller's feedback and feed forward control elements. The method may also involve using a first asymmetric controller associated with the first axle of the vehicle for generating a torque signal $T_{AC}$ based on an augmentation of the controller's feedback and feed forward control elements. The first total controller and the first asymmetric controller may also be used to detect a real time operating condition of each wheel which includes a wheel slip condition and a wheel non-slip (stable) condition, and based on the condition, to determine the augmentation of their respective feedback and feed forward elements in order to provide improved stability and acceleration of the vehicle. The method may also involve using a distributor to resolve the two said controllers' outputs $T_{TC}$ and $T_{AC}$ into targets for three actuators available on the axle $T_D$, $T_{BL}$ and $T_{BR}$ in accordance with the following two formulas:

$$T_{TC} = T_D - T_{BL} - T_{BR}$$

$$T_{AC} = T_{BL} T_{BR}$$

where $T_D$=drive torque applied to the first axle;

$T_{BL}$=brake torque applied to left wheel of the first axle; and $T_{BR}$=brake torque applied to right wheel of the first axle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7 is a table illustrating the augmentation of the feedback and feed forward components of the total controller and asymmetric controller, for a given axle of the vehicle, in different control regions.

DETAILED DESCRIPTION

Figure 1:
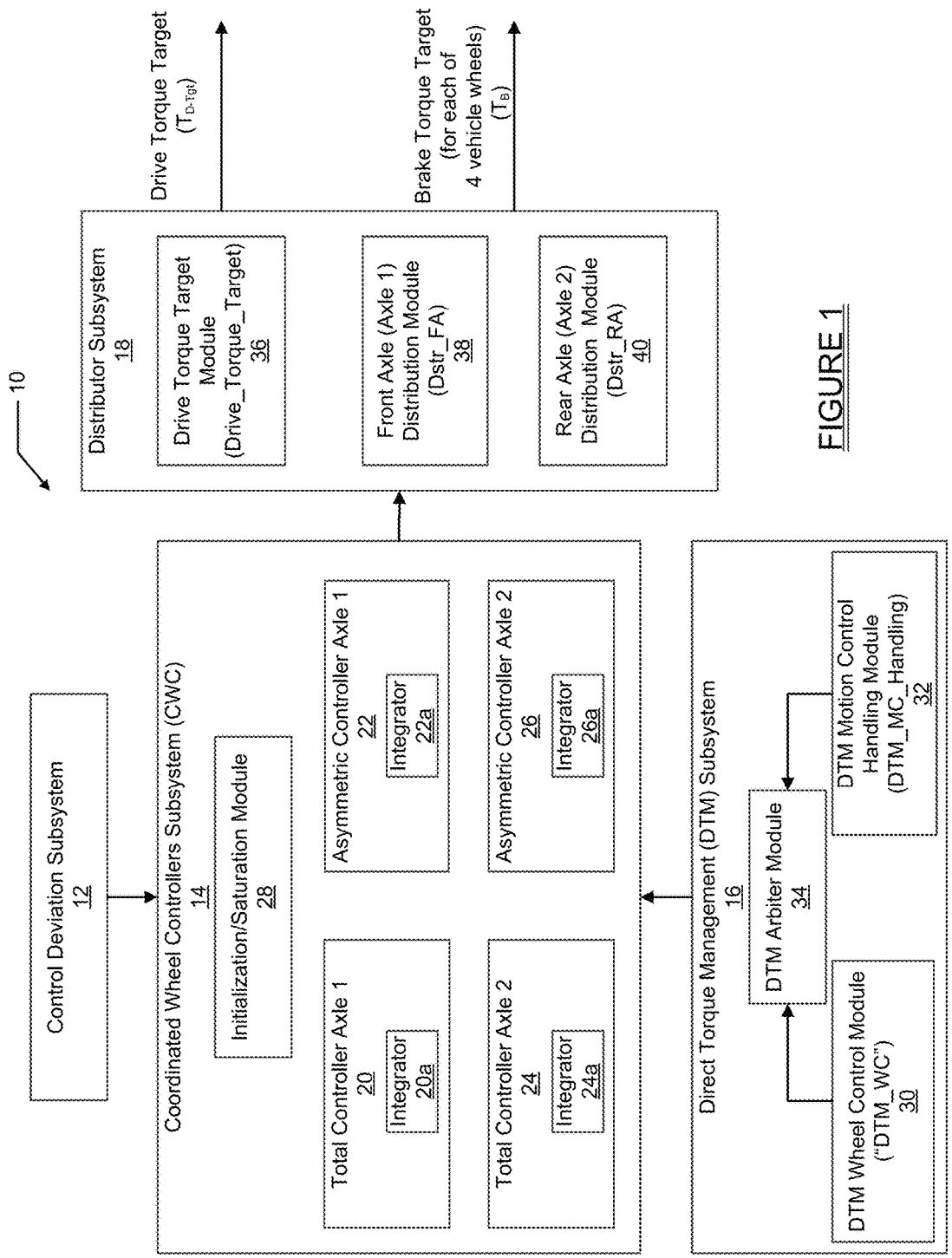
FIG. 1 is a high level block diagram of one embodiment of a system in accordance with the present disclosure for independently controlling vehicle acceleration and wheel slip at each wheel of a vehicle.

The following description is merely exemplary in nature and is not intended to limit the present disclosure, application, or uses. It should be understood that throughout the drawings, corresponding reference numerals indicate like or corresponding parts and features.

The present disclosure describes a system 10, shown in FIG. 1, for controlling both wheel slip at each slipping wheel of a motor vehicle such as a car or truck, as well as for independently and explicitly controlling the vehicle acceleration supplied by each non-slipping wheel, in a manner to improve the stability and acceleration of the vehicle. The system 10 separates the control of wheel slip and vehicle acceleration such that when there is a slipping wheel, its slip can be controlled to a desirable target, and when there is a stable wheel (i.e., no significant slip), the vehicle acceleration capability supplied by that wheel can be explored in an explicit manner. The above two tasks are accomplished by the system 10 simultaneously and independently for an axle regardless of the combination of the wheels' statuses on that axle. More specifically, these tasks are accomplished by the system 10 regardless if the wheels on a given axle are both slipping, both stable, or if one is slipping and the other is stable.

It is also an important advantage of the system 10 that it uses the same sensor set as conventional ABS/TCS systems (e.g., wheel speed sensors, brake master cylinder pressure sensor, etc.). The system 10 also commands the same actuators (e.g., engine, brake hydraulic control unit, etc.), thus allowing the system 10 to be implemented in a conventional brake control system architecture.

Figure 3:
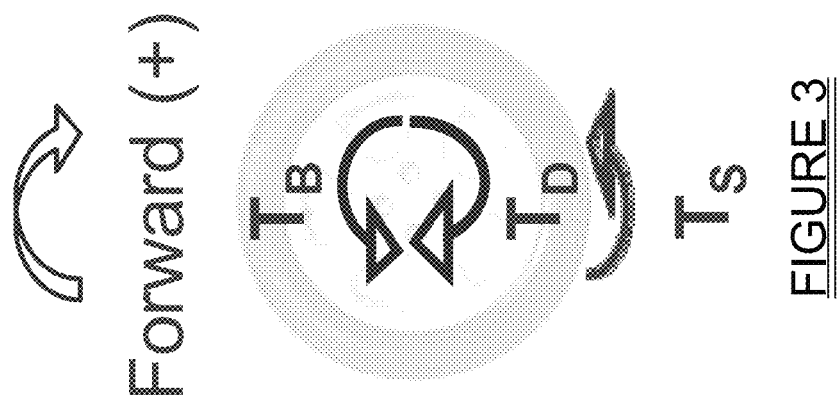
FIG. 3 is a high level diagram illustrating in simplified fashion the torques acting on a wheel-brake torque ($T_B$), drive torque ($T_D$) and surface torque ($T_S$), the definitions of their respective directions and the dynamics associated with them, along with rotational moment of inertia of the a wheel.

With brief reference to FIG. 3, the system 10 makes use of a wheel control algorithm that recognizes and makes use of the following principles and experiences of wheel and vehicle dynamics, wherein an angular acceleration of a given wheel is represented by the following formula:

$$\dot{w} = \frac{T_D - T_B - T_S}{i_W} \quad \text{(Eq. 1)}$$

Figure 4:
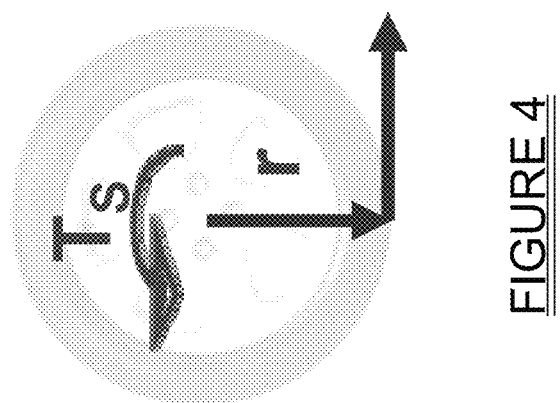
FIG. 4 is a high level diagram illustrating in simplified fashion the definitions and relations of surface torque ($T_S$), tire rolling radius (r) and surface force ($F_S$)

$\dot{w}$: Agular Acceleration of The Wheel
$T_D$: Drive Torque (provided by drive train)
$T_B$: Brake Torque (defined in the negative direction)
$T_S$: Surface Torque (provided by the road surface)
$i_W$: Rotational Moment of Inertia of The Wheel Surface torque ($T_S$) is also an important variable that is considered by the system 10. With reference to FIG. 4 and the equations below, surface torque ($T_S$) may be expressed as:

$$\vec{T}_S = \vec{r} \cdot \vec{F}_S \quad \text{(Eq. 2)}$$

$|r|$: Tire rolling radius
$\vec{F}_S$: Surface Force $F_S$ does not appear in wheel dynamics but it is responsible for vehicle acceleration ($\Sigma F_S = Ma$, where "M" is the vehicle mass and "a" is the vehicle acceleration). Surface torque ($T_S$) is a direct result of surface force ($F_S$) and does directly affect wheel dynamics as shown in Equation 1 above.

Due to the location of surface force ($F_S$) application, $F_S$ and $T_S$ always have opposite effects on vehicle acceleration and wheel acceleration. FIG. 4 helps to illustrate this point by showing that $F_S$ is accelerating the vehicle to the right while $T_S$ is decelerating the wheel.

Figure 5:
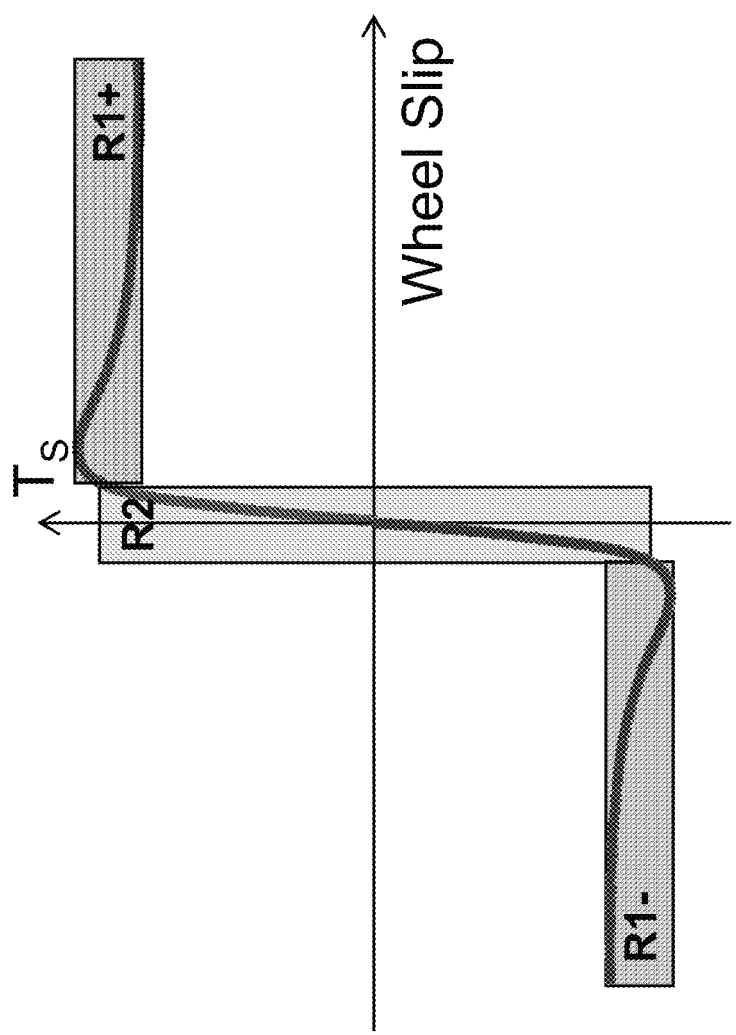
FIG. 5 is a high level diagram illustrating in simplified form the behavior of surface torque ($T_S$) with respect to wheel slip in both positive and negative "slip" regions (R1+ and R1−, respectively), as well as in a "stable" region (R2)

FIG. 5 helps to illustrate the behavior of surface torque ($T_S$). Surface torque ($T_S$) behavior can be characterized by the following formulas:

$T_S = f(\text{Slip})$: Slipping Wheel $$T_S \gg T_D - T_B: \text{Stable Wheel} \quad \text{(Eq. 3)}$$

Positive Slip→Positive $F_S$→Positive $T_S$
Negative Slip→Negative $F_S$→Negative $T_S$ FIG. 5 describes when a wheel is in the slipping region (either region R1+ or R1−), $T_S$ reacts to slip, and $T_S$ varies only slightly. When a wheel is in the stable region (R2), $T_S$ reacts to input torque directly and the slip varies only slightly.

The system 10 further uses approximations of vehicle axle dynamics by using the following formulas:

$\dot{w}_L, \dot{w}_R$: Angular acceleration of Left/Right wheel
$\dot{w}_T, \dot{w}_A$: Total/Asymmetric angular acceleration of the axle
$T_{BL}, T_{BR}$: Left/Right brake torque
$T_{SL}, T_{SR}$: Left/Right surface torque
$i_E$: Engine inertia
G: Power train ratio Total Dynamics (Driven axle)

$$\dot{w}_T = \dot{w}_L + \dot{w}_R = \frac{T_D - T_{BL} - T_{BR} - T_{SL} - T_{SR}}{i_E \cdot G^2/2 + i_W} \qquad \text{Eq. 4}$$

Total Dynamics (Non-driven axle)—treated as a special case of Eq. 4

$$\dot{w}_T = \dot{w}_L + \dot{w}_R = \frac{-T_{BL} - T_{BR} - T_{SL} - T_{SR}}{i_w} \qquad \text{Eq. 5}$$

Asymmetric Dynamics $$\dot{w}_A = \dot{w}_L - \dot{w}_R = \frac{-T_{BL} + T_{BR} - T_{SL} + T_{SR}}{i_w} \qquad \text{Eq. 6}$$

Referring again to FIG. 1, an overall, high level description of the various modules and subsystem of the system 10 will initially be provided. The system 10 in this embodiment makes use of a control deviation subsystem 12, a coordinated wheel controllers subsystem 14 (hereinafter "CWC subsystem 14"), a direct torque management subsystem 16 (hereinafter "DTM subsystem 16") and a distributor subsystem 18.

The control deviation subsystem 12 calculates the targets and deviations for both the positive wheel slip and the negative wheel slip control regions (regions R1+ and R1− in FIG. 5). In addition, the control deviation subsystem 12 also determines the control region of each wheel, that is, whether a wheel is slipping (i.e., in either region R1+ or R1−) or stable (region R2) based on the wheel speed feedback and vehicle speed estimate.

The CWC subsystem 14 includes a total controller 20 having an integrator 20a and an asymmetric controller 22 having an integrator 22a. Both controllers are used for independently controlling a pair of wheels associated with a first axle of the vehicle. A second total controller 24 having an integrator 24a and a second asymmetric controller 26 having an integrator 26a are used for independently controlling a pair of wheels associated with a second axle of the vehicle. An initialization/saturation module 28 is used for monitoring the actuation outputs and driver commands (e.g., drive torque target vs. driver intended drive torque etc.), as well as for performing calculations needed to support the initialization and reset of the integrators 20a-26a associated with each of the controllers 20-26 when actuator saturation is detected (e.g., integrator wind-up reset).

The DTM subsystem 16 includes a DTM wheel control module 30 for determining an explicit rate of change of surface torque ($T_S$) for each stable wheel ($dT_{s\_ij}$, "ij" being wheel index—FL, FR, RL, RR), which is desirable based on the real time conditions being detected. This rate of change can be positive or negative. Both directions can be applied in acceleration, deceleration or coasting modes. For example, a positive $dT_S$ when the wheel is providing vehicle acceleration ($T_S$ is positive) means to increase acceleration provided by the wheel; a positive $dT_S$ when $T_S$ is negative means to decrease deceleration that is provided by the wheel. A DTM motion control handling module 32 is used to receive DTM commands (e.g., wheel torque targets) from a motion control subsystem such as an electronic stability control (ESC) system (not shown). The DTM motion control handling module 32 checks if the wheels receiving the DTM commands are stable, and if so, calculates the rate of change of surface torque for each stable wheel ($dT_{s\_ij}$) which are needed to execute the motion control subsystem's commands. A DTM arbiter module 34 is included which arbitrates the signals ($dT_{s\_ij}$) received from the DTM wheel control module 30 and the DTM motion control handling module 32. For each axle of the vehicle, the DTM arbiter 34 calculates (according to Eq. 10 below) the rates of change of torque outputs ($dT_{TC}$ and $dT_{AC}$) from the CWC subsystem 14 that are required to induce the $dT_{SL}$ and $dT_{SR}$ as a result of the arbitration.

$$\begin{cases} dT_{TC} = dT_{SL} + dT_{SR} & \text{for Total Controller} \\ dT_{AC} = dT_{SL} - dT_{SR} & \text{for Asymmetric Controller} \end{cases} \qquad \text{Eq. 10}$$

As shown in FIG. 1, the distributor subsystem 18 includes a drive torque target module 36, a front axle distribution module 38 and a rear axle distribution module 40. The drive torque target module 36 receives the output from the CWC subsystem 14 and outputs a drive torque target ($T_{D\_TGT}$) for the engine of the vehicle, but at a wheel level. The front axle distribution module 38 takes the output from the CWC subsystem 14 and the drive torque target and outputs a pair of brake torque targets for the front (i.e., first) axle of the vehicle, while the rear axle distribution module 40 performs the same operation for the rear (i.e., second) axle.

A principal advantage of the system 10 is the use of two controllers (i.e., controllers 20/22 or 24/26) for each axle of the vehicle, which can independently control the dynamics of both wheels on a given axle, as well as of a drivetrain potentially connected to the given axle, in all operational situations without needing additional controllers. The total controller (20 or 24) has an output $T_{TC}$ to be actuated by the combination of ($T_D-T_{BL}-T_{BR}$) or by ($-T_{BL}-T_{BR}$) if no engine control is available. Each asymmetric controller (22 or 26) produces an output $T_{AC}$ to be actuated by the combination ($-T_{BL}+T_{BR}$). These controllers 20-26 use all available actuators and control all existing dynamics on an axle as described above in Equations 4-6.

Having an element of PID feedback control for both controllers (20/22 or 24/26) can control any wheel slip with good transient and steady state characteristics, provided the following is true:
  The wheel(s) $T_S$ stays relatively constant (i.e. the wheel is slipping—in Control Region R1+ or R1− as in FIG. 5);
  The slipping wheel(s) speed is the feedback for the controllers;
  Torque is the output of the controllers;
  And the stable wheel's $T_S$ will not respond to the controller's torque output in a way that it will cancel the controllers' action as applied to the individual dynamics (Eq. 4-6) in the situation.

Having an element of feed forward control for both above mentioned controllers can explicitly induce changes in a wheel's (or a pair of wheels) $T_S$, and therefore vehicle acceleration, if:
  the wheel (or wheels') $T_S$ reacts to input torque directly (i.e., the wheel is stable in control region R2 as shown in FIG. 5; and
  the above mentioned changes in $T_S$ for both wheels are consistent when translated to feed forward commands for both controllers (e.g., no change for $T_{SL}$ and +100 Nm for $T_{SR}$ should translate to commands of +100 Nm for the Total controller (20 or 24) and −100 Nm for the asymmetric controller (22 or 26)).

Having a detection of a wheel's control region based on its slip as shown in FIG. 5, the system 10 can approximately understand the wheel's $T_S$ behavior as shown in Equation 3. Augmenting the feedback and feed forward elements of both controllers (20/22 or 24/26) based on the combination of $T_S$ behavior understood for both wheels on the axle can achieve control of the slipping wheel's (or wheels') slip, while independently and explicitly exploring the capability of the stable wheel (or wheels) for vehicle acceleration.

Thus, the system 10 implements, for each axle of the vehicle, controllers 20 or 24, which are each a PID (proportional Integral Derivative) feedback controller with wheel speed feedback and torque output to control the total dynamics, and one for the asymmetric dynamics (i.e., controllers 22 and 26). The system 10 has feed forward inputs that come from direct torque management 16 to both of the controllers' integrators (20a/22a and 24a/26a) and detects the control region (stable or slipping) of each wheel on the axle, and depending on the two wheels' control regions configures the augmentations of the feedback and feed forward elements of both controllers. The system 10 also distributes both controllers 20/22 and 24/26 outputs into two brake torque signals and one drive torque signal. The system 10 applies the same design as above to all ABS/TCS situations and to handle the ESC's wheel slip and wheel torque targets, even if slip targets of opposite signs are received for two wheels on an axle.

Referring further to FIG. 1, the operation of the control deviation subsystem 12 will be described in further detail. The control deviation subsystem 12 includes software that performs the following functions for each axle:

transforming individual wheel speed targets to Axle Total and Axle Asymmetric Targets, for a given axle, using the following equation:

$$\begin{bmatrix} V_{Tgt\_TC} \\ V_{Tgt\_AC} \end{bmatrix} = \begin{bmatrix} 1 & 1 \\ 1 & -1 \end{bmatrix} \cdot \begin{bmatrix} VW_{Tgt\_L} \\ VW_{Tgt\_R} \end{bmatrix} \quad \text{Eq. 7}$$

transforming the feedback associated with individual wheels on a given axle to Axle Total and Axle Asymmetric Feedback using the following equation:

$$\begin{bmatrix} V_{FB\_TC} \\ V_{FB\_AC} \end{bmatrix} = \begin{bmatrix} 1 & 1 \\ 1 & -1 \end{bmatrix} \cdot \begin{bmatrix} VW_L \\ VW_R \end{bmatrix} \quad \text{Eq. 8}$$

calculating the Axle Total and Axle Asymmetric Control Deviation using the following equation:

$$\begin{bmatrix} V_{Dev\_TC} \\ V_{Dev\_AC} \end{bmatrix} = \begin{bmatrix} V_{Tgt\_TC} \\ V_{Tgt\_AC} \end{bmatrix} - \begin{bmatrix} V_{FB\_TC} \\ V_{FB\_AC} \end{bmatrix} \quad \text{Eq. 9}$$

wherein:
$VW_{Tgt\_L}$=target speed for left wheel;
$VW_{Tgt\_R}$=target speed for right wheel;
$V_{Tgt\_TC}$=axle total target speed for total controller (20 or 24);
$V_{Tgt\_AC}$=axle asymmetric target speed for asymmetric controller (22 or 26);
$VW_L$=wheel speed feedback for left wheel;
$VW_R$=wheel speed feedback for right wheel;
$V_{FB\_TC}$=wheel speed feedback for total controller (20 or 24);
$V_{FB\_AC}$=wheel speed feedback for asymmetric controller (22 or 26);
$V_{Dev\_TC}$=axle total control deviation for total controller;
$V_{Dev\_AC}$=axle asymmetric control deviation for asymmetric controller.

It should be appreciated that the target wheel speed can be commanded by an external subsystem (e.g., a Motion Control system, or more specifically ESC), allowing system 10 to serve as an actuator for such systems and allowing such systems to delete their internal wheel dynamics controllers.

Figure 6:
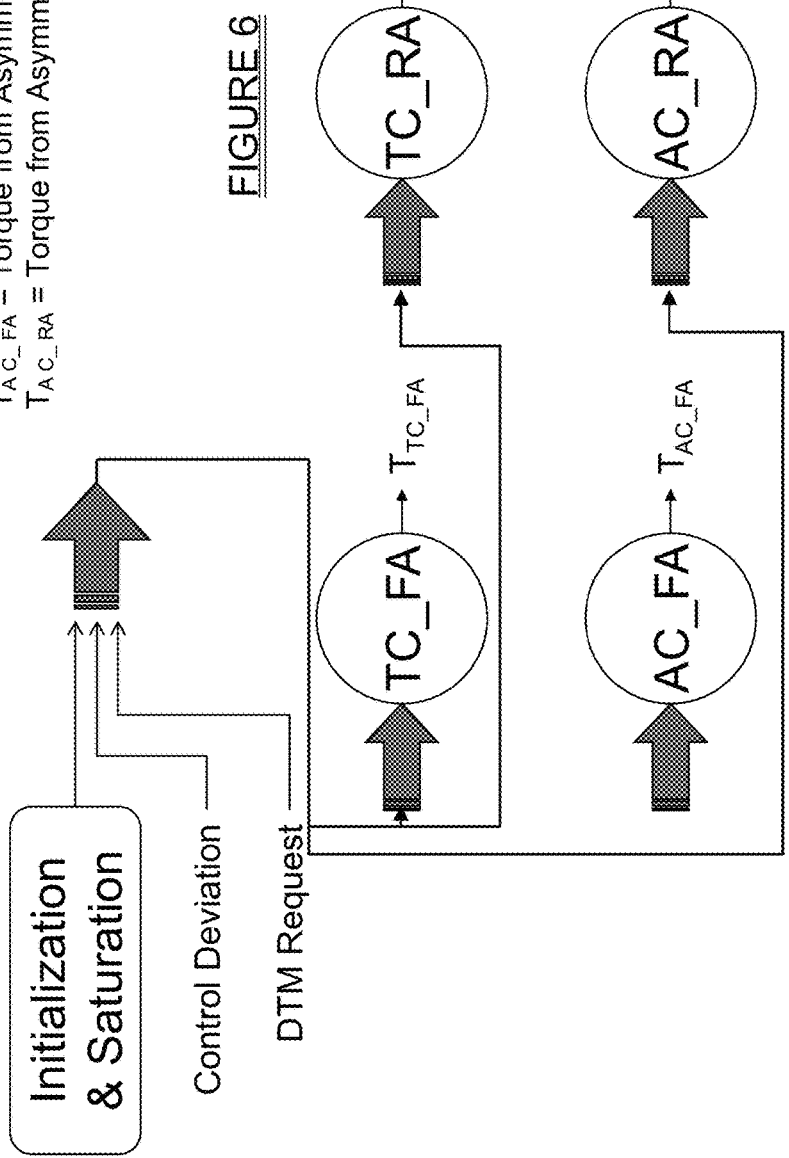
FIG. 6 is a high level block diagram of various functions performed by the CWC subsystem of the present disclosure.

With further reference to FIGS. 1 and 6, the operations of the CWC subsystem 14 will be further described. Each total controller 20 or 24 takes the feedback error input ($V_{DEV\_TC}$) and applies in general a PID control with gain scheduling based on components connected to the axle and actuators (e.g., engine and/or brakes) available to effect their dynamics. Each total controller 20 or 24 also takes the feed forward DTM input $dT_{TC}$ and augments it to its integrator (20a or 24a). The total controller 20 or 24 also takes the control region output from the control deviation subsystem 12 and determines a configuration of augmentation of the feedback and feed forward control according to the pre-defined table of FIG. 7. The total controller 20 or 24 then calculates the total torque that the system 10 should output to its associated axle (e.g., $T_{TC\_FA}$=Torque from Total Controller Front Axle) according to the above-mentioned augmentation of the feedback and feed forward elements.

With further reference to FIG. 1, the asymmetric controller 22 or 26 each take the feedback error input $V_{DEV\_AC}$ and apply in general a PID control with gain scheduling based on actuators available to effect the asymmetric dynamics. Each asymmetric controller 22 or 26 can also take the feed forward DTM input of $dT_{AC}$ and augment it to its integrator (22a or 26a). The asymmetric controller 22 or 26 also takes the control region output from the control deviation module and determines a configuration of augmentation of the feedback and feed forward control, for example, according to the table of FIG. 7. The asymmetric controller 22 or 26 also calculates the asymmetric torque that the system 10 should output to the axle (e.g., $T_{AC\_RA}$=Torque from Asymmetric Controller Rear Axle) according to the above-mentioned augmentation of the feedback and feed forward elements.

Figure 8:
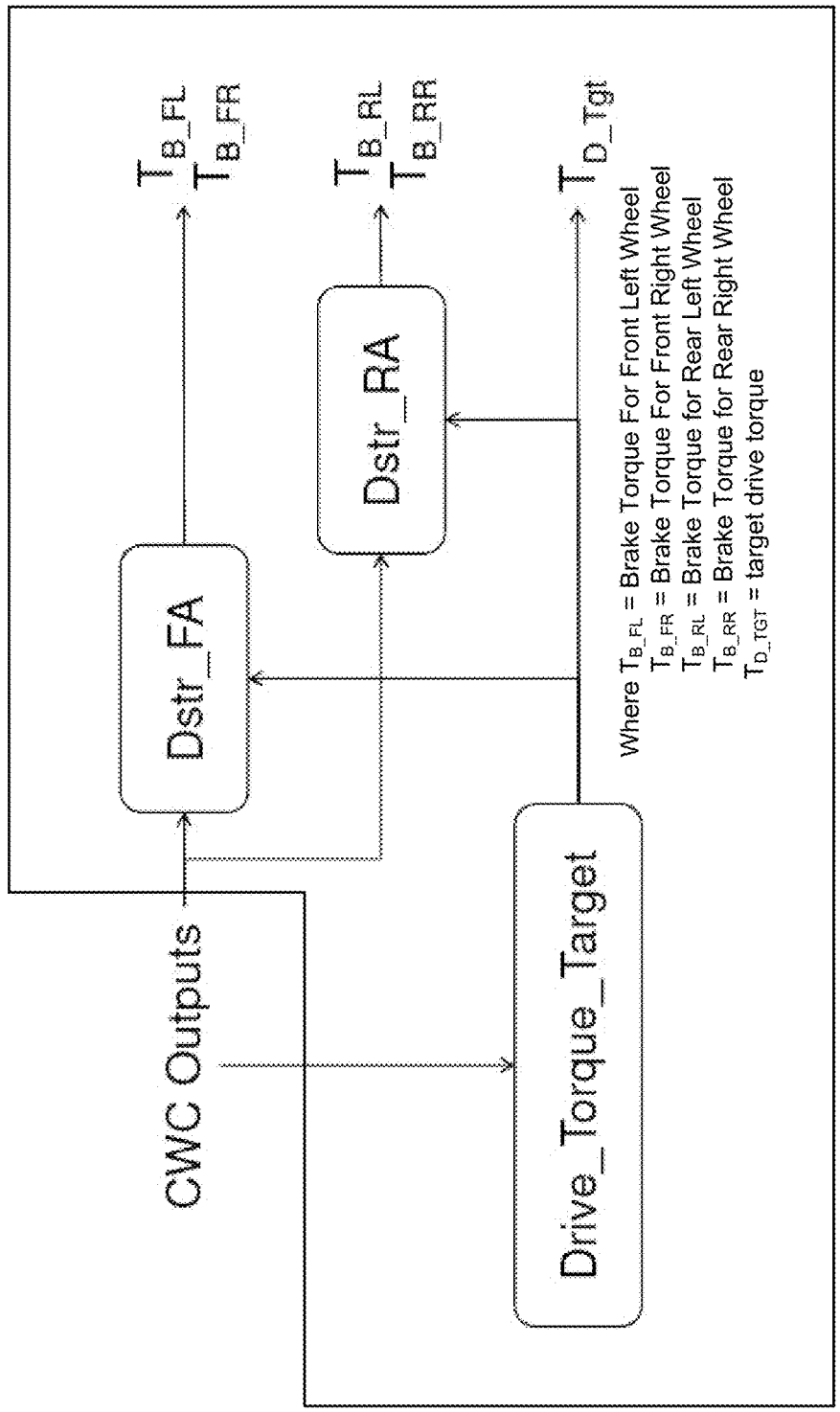
FIG. 8 is a block diagram illustrating operations of the distributor subsystem.

Referring now to FIG. 8, the operation of the distributor subsystem 18 (shown in FIG. 1) will be described in greater detail. The drive torque target module 36 receives the output from the CWC subsystem 14 and outputs a drive torque target ($T_{D\_Tgt}$) for the engine of the vehicle, but at a wheel level. The front axle distribution module 38 and the rear axle distribution module 40 take the output from the CWC subsystem 14 and the drive torque target ($T_{D\_Tgt}$) and each output two brake torque targets for their respective axle. Put differently, the front axle distribution module 38 outputs a pair of brake torque targets ($T_{B\_FL}$=brake torque for front left wheel and $T_{B\_FR}$=brake torque for front right wheel) for the front axle of the vehicle and the rear axle distribution module 40 outputs a pair of brake torque targets ($T_{B\_RL}$=brake torque for rear left wheel and $T_{B\_RR}$=brake torque for rear right wheel) for the rear axle of the vehicle.

For each axle, the equations below are what the distributor subsystem 18 need to satisfy:

$$\begin{cases} T_{TC} = T_D - T_{BL} - T_{BR} & \text{Remove } T_D \text{ for non-driven axle} \\ T_{AC} = -T_{BL} + T_{BR} \end{cases} \quad \text{Eq. 11}$$

To satisfy the above equation set, the distributor subsystem 18 calculates a desirable combination of the outputs based on conditions. For example, to do so in a very efficient manner, the distributor uses the equations below:

$$T_{D\_Tgt} = T_{TC} + |T_{AC}|$$

$$T_{TC\_BrkTgt} = T_{TC} - T_{D\_Est}$$

$$T_{BL\_Tgt} = -(T_{TC\_BrkTgt} + T_{AC})/2$$

$$T_{BR\_Tgt} = -(T_{TC\_BrkTgt} - T_{AC})/2$$

The term $T_{D\_Est}$ is the estimated drive torque received by system 10. It should be clarified at this point that $T_{BL\_Tgt}/T_{BR\_Tgt}$ in this equation set are the same as $T_{BL}/T_{BR}$ in Eq. 11 and elsewhere in this document. The abbreviation "Tgt" (target) is only added here to signify the fact that these are the final outputs from the system 10 and will be transmitted as targets for execution to a downstream subsystem in the overall brake control system (not described by present disclosure). Furthermore, when this calculation is applied to an axle this generic name changes to a more specific name. For example, when applied to the front axle, $T_{BL\_Tgt}$ simply becomes $T_{B\_FL}$ (where $T_B$ stands for Brake Torque and FL stands for Front Left), as used herein.

Figure 2:
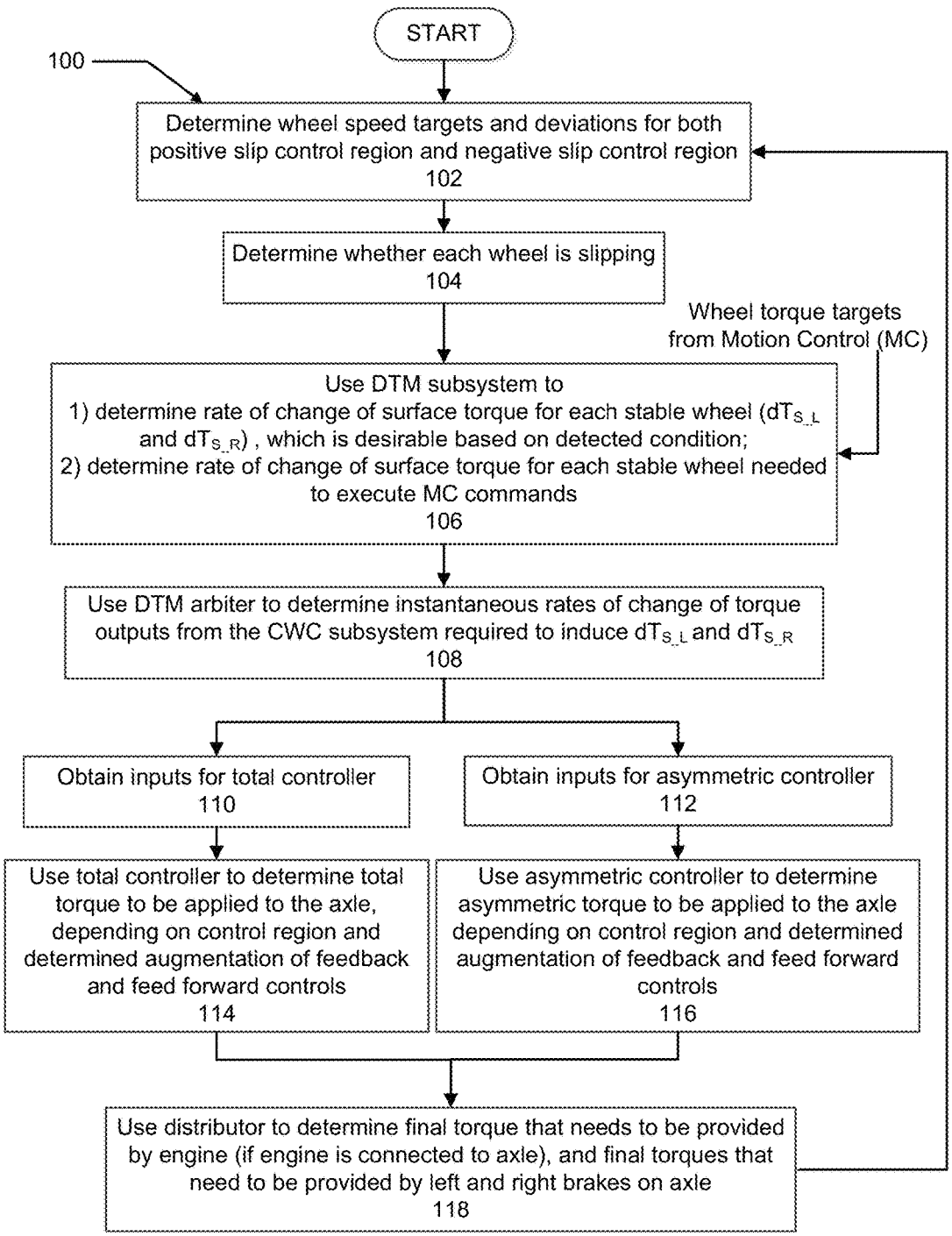
FIG. 2 is a high level flowchart illustrating major operations of the system of FIG. 1 in independently controlling vehicle acceleration and wheel slip at each wheel of the vehicle.

With brief reference to FIG. 2, a flowchart 100 is shown illustrating a plurality of major operations that the system 10 performs when controlling braking associated with each wheel and a drive torque applied to each axle of the vehicle. At operation 102 the system 10 determines wheel speed targets and deviations for both the positive slip control regions (R1+) and the negative slip control region (R1−). At operation 104 the CWC subsystem 14 determines whether each wheel of the vehicle is slipping. At operation 106 the DTM subsystem 16 is used to determine: 1) the rate of change of surface torque for each stable wheel, which is desirable based on a real time detected condition; and 2) the rate of change of surface torque of each stable wheel which is needed to execute motion control (MC) commands.

At operation 108 the DTM arbiter module 34 is used to first arbitrate the final rate of change of surface torque for each stable wheel $dT_{SL}$ and $dT_{SR}$, and then to determine the instantaneous rates of change of torque outputs from the CWC subsystem 14 required to induce the final $dT_{SL}$ and $dT_{SR}$. At operations 110 and 112 the inputs for the total controller 20 are obtained (operation 110) and the inputs for the asymmetric controller 22 are obtained (operation 112). It will be appreciated that if the wheels on two different axles are being controlled by the system 10, then the inputs obtained will be for both total controllers 20/24 and both asymmetric controllers 22/26.

At operation 114 the total controller(s) (20 and/or 22) is/are used to determine total torque to be applied to a given axle (or axles), depending on the real time control region that each wheel on the axle(s) is operating in and on the pre-determined augmentation of feedback and feed forward control elements. Similarly, at operation 116 the asymmetric controller(s) (22 and/or 26) is/are used to determine asymmetric torque to be applied to the axle(s) according to the pre-determined augmentation of feedback and feed forward controls. At operation 118 the distributor subsystem is used to determine first a desired drive torque ($T_{D\_Tgt}$), then a pair of desired brake torque ($T_{BS}$ and $T_{BR}$) for each axle, which should best satisfy the outputs of the CWC subsystem. At this point operations 102-118 may be repeated. Again, it will be appreciated that the determinations and calculations performed in the operations of flowchart 100 are performed in real time to take into account real time wheel operating slippage conditions.

The present system 10 and method of the present disclosure thus makes use of two controllers (20/22 and 24/26), each having feedback and feed forward control elements for each axle of the vehicle, one of which provides for a torque output to control the total dynamics associated with the wheels of a given axle and other components attached to the axle, and the other to control the asymmetric dynamics. The system 10 is able to detect the control region (e.g., slipping or not slipping) that each wheel of the vehicle is operating in, to augment the usage of the feedback and feed forward elements of the two controllers according to the control region detection, and to apply the appropriate actuators of the vehicle to control the dynamics of the wheels of a given axle. The use of a pair of controllers with each axle allows the system 10 to control the dynamics of all slipping wheels and other components attached to the two axles of a vehicle, and of the vehicle acceleration provided by all stable wheels attached to the two axles of the vehicle, without needing additional controllers, and by using those actuators that already exist on the vehicle.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for real time control of a wheel slip of each one of a pair of wheels associated with a first axle of a motor vehicle, simultaneously and independently with real time explicit control of an acceleration of said motor vehicle provided by each non-slipping one of the pair of wheels, the system comprising:
a coordinated wheel controller (CWC) subsystem having:
a first total controller associated with the first axle of the vehicle for generating a torque signal ($T_{TC}$) used to control total dynamics of the first axle; and
a first asymmetric controller associated with the first axle, which is operable to generate another torque signal ($T_{AC}$) to control asymmetric dynamics of the first axle;
the first total controller and the first asymmetric controller each further configured to include:
a wheel slip feedback control mode; and
a feed forward control mode;
the feed forward control mode enabling the controllers to induce changes in a specific wheel's surface torque ($T_S$), and therefore influence vehicle acceleration;
the first total controller and the first asymmetric controller each further configured to detect a real time operating condition of each said wheel which includes a wheel slip condition and a wheel non-slip condition, and to augment the respective wheel slip feedback control mode and the feed forward control mode associated with each said controller, the augmentation being based on the detected operating condition of each said wheel and a pre-defined table of conditions; and a distributor subsystem used for generating a drive torque target ($T_D$) if a drive train of the motor vehicle is associated with the first axle and the torque signal is controllable, and further generating a brake torque target for a left wheel ($T_{BL}$) and a brake torque target for a right wheel ($T_{BR}$) associated with the first axle, in response to the torque signal ($T_{TC}$) and the another torque signal ($T_{AC}$) of the CWC subsystem and in a manner such that the following equations are satisfied:

$$\begin{cases} T_{TC} = T_D - T_{BL} - T_{BR} \\ T_{AC} = -T_{BL} + T_{BR} \end{cases}.$$

2. The system of claim 1, wherein the predefined table of conditions comprises conditions set forth in Table 1 of FIG. 7 hereof.

3. The system of claim 1, further comprising a direct torque management (DTM) subsystem having:
a DTM wheel control module for calculating the desired rate of change of a surface torque experienced by each wheel whenever each said wheel is operating in a stable operating region and not experiencing wheel slip.

4. The system of claim 3, wherein the DTM subsystem further includes a DTM motion control handling module for calculating the another desired change of a surface torque experienced by each wheel in response to torque commands of an external system on each said wheel, whenever each said wheel is operating in a stable operating region and not experiencing wheel slip.

5. The system of claim 4, wherein the DTM subsystem further comprises a DTM arbiter module responsive to the DTM wheel control module and to the DTM motion control handling module, the DTM arbiter module being configured to arbitrate the outputs from the DTM wheel control module and the DTM motion control handling module which relate to the rate of change of surface torque for each one of the wheels which is operating in a non-slipping operating region, and
then for the DTM arbiter module to calculate rates of change of surface torque outputs ($dT_{TC}$ and $dT_{AC}$) from the first total controller and the first asymmetric controller, respectively, of the CWC subsystem that are required to induce arbitrated rates of change of surface torques for the two wheels ($dT_{SL}$ and $dT_{SR}$).

6. The system of claim 1, further comprising an initialization and saturation module for performing calculations needed to support the initialization and a reset of a controller of the CWC subsystem when system saturation is detected.

7. The system of claim 1, further comprising a control deviation subsystem configured to detect when each said wheel is slipping on a ground surface and when each said wheel is stable and not slipping on a ground surface.

8. The system of claim 7, wherein the control deviation subsystem is further configured to:
transform wheel speed targets for each of the wheels to axle total and axle symmetric targets;
transform individual wheel speed feedback associated with each of the wheels to axle total and axle symmetric feedback values; and
to calculate an axle total and an axle asymmetric control deviation value.

9. The system of claim 1, wherein the vehicle includes a second axle, and the system further comprises:
a second total controller operably associated with the second axle; and a second asymmetric controller operably associated with the second axle;
both the second total controller and the second asymmetric controller configured identically to the first total controller and the first asymmetric controller, including having identical support from the distributor subsystem.

10. A system for real time control of a wheel slip of each one of a pair of slipping wheels associated with a first axle of a motor vehicle, simultaneously and independently with real time explicit control of an acceleration of said motor vehicle provided by a non-slipping one of the pair of wheels, the system comprising:
a control deviation module for determining whether either said wheel is slipping or stable and non-slipping, and for calculating a total control deviation and a total asymmetric control deviation of said axle;
a direct torque management (DTM) subsystem for controlling a surface torque of each of the wheels;
a coordinated wheel controller (CWC) subsystem having:
a first total controller associated with the first axle of the vehicle for generating a torque signal ($T_{TC}$) used to control total dynamics of the first axle;
a first asymmetric controller associated with the first axle, which is operable to generate another torque signal ($T_{AC}$) to control asymmetric dynamics of the first axle;
and each of said first total controller and said first asymmetric controller configured to implement a feed forward mode in which each is able to induce changes in a specific wheel's surface torque ($T_S$), and therefore to influence vehicle acceleration;
the direct torque management (DTM) subsystem operating to determine a rate of change of surface torque outputs from each of the first total controller ($dT_{TC}$) and the first asymmetric controller ($dT_{TC}$) that are required to induce a desired rate of change of the surface torque for each said wheel ($dT_{SL}$ and $dT_{SR}$); and
a distributor subsystem responsive to the CWC subsystem for generating a drive torque target $T_D$ if a drive train of the motor vehicle is associated with the first axle and drive train is controllable, and for generating a brake torque target for a left wheel ($T_{BL}$) and for a right wheel ($T_{BR}$) each wheel associated with the first axle, in response to torque signal ($T_{TC}$) and the another torque signal ($T_{AC}$) from the CWC subsystem.

11. The system of claim 10, wherein the control deviation module generates the axle total control deviation and axle asymmetric control deviation by:
first transforming $$\begin{bmatrix} V_{Tgt\_TC} \\ V_{Tgt\_AC} \end{bmatrix} = \begin{bmatrix} 1 & 1 \\ 1 & -1 \end{bmatrix} \cdot \begin{bmatrix} VW_{Tgt\_L} \\ VW_{Tgt\_R} \end{bmatrix} \qquad \text{Eq. 7}$$

individual wheel speed targets to axle total and axle asymmetric targets in accordance with a formula:
then transforming individual wheel speed feedback to axle total and axle asymmetric feedback in accordance with a formula:

$$\begin{bmatrix} V_{FB\_TC} \\ V_{FB\_AC} \end{bmatrix} = \begin{bmatrix} 1 & 1 \\ 1 & -1 \end{bmatrix} \cdot \begin{bmatrix} VW_L \\ VW_R \end{bmatrix} \qquad \text{Eq. 8}$$

then applying the formula:

$$\begin{bmatrix} V_{Dev\_TC} \\ V_{Dev\_AC} \end{bmatrix} = \begin{bmatrix} V_{Tgt\_TC} \\ V_{Tgt\_AC} \end{bmatrix} - \begin{bmatrix} V_{FB\_TC} \\ V_{FB\_AC} \end{bmatrix} \qquad \text{Eq. 9}$$

where
- $VW_{Tgt\_L}$=target speed for left wheel;
- $VW_{Tgt\_R}$=target speed for right wheel;
- $V_{Tgt\_TC}$=axle total target speed;
- $V_{Tgt\_AC}$=axle asymmetric target speed;
- $VW_L$=left wheel speed feedback;
- $VW_R$=right wheel speed feedback;
- $V_{FB\_TC}$=axle total feedback;
- $V_{FB\_Ac}$=axle asymmetric feedback;
- $V_{Dev\_TC}$=axle total control deviation; and
- $V_{Dev\_AC}$=axle asymmetric control deviation.

12. The system of claim 10, wherein the DTM subsystem comprises:
  a DTM wheel control module for calculating the desired rate of change of a surface torque experienced by each wheel whenever each said wheel is operating in a stable operating region and not experiencing wheel slip;

$$\begin{bmatrix} V_{Dev\_TC} \\ V_{Dev\_AC} \end{bmatrix} = \begin{bmatrix} V_{Tgt\_TC} \\ V_{Tgt\_AC} \end{bmatrix} - \begin{bmatrix} V_{FB\_TC} \\ V_{FB\_AC} \end{bmatrix} \qquad \text{Eq. 9}$$

a DTM motion control handling module for calculating the another desired change of a surface torque experienced by each wheel in response to torque commands of an external system, whenever each said wheel is operating in a stable operating region and not experiencing wheel slip; and
  a DTM arbiter module responsive to the DTM wheel control module and the DTM motion control handling module, which is configured to arbitrate outputs from said DTM wheel control module and said DTM motion control handling module into a final rate of change of surface torque for each one of the wheels ($dT_{SL}$ and $dT_{SR}$) which is operating in a non-slipping operating region, and then for the first axle to calculate the rates of change of surface torque outputs ($dT_{TC}$ and $dT_{AC}$) from the first total controller and the first asymmetric controller, respectively, of the CWC subsystem that are required to induce the surface torque outputs ($dT_{SL}$ and $dT_{SR}$) in accordance with a formula:

$$\begin{cases} dT_{TC} = dT_{SL} + dT_{SR} \\ dT_{AC} = dT_{SL} - dT_{SR} \end{cases}.$$

13. The system of claim 10, wherein the first total controller of the CWC subsystem is further configured to include:
  a wheel slip feedback control mode, which is configured to apply a feedback control to a total control deviation of the first axle ($V_{Dev\_TC}$) which is calculated by the control deviation module;
  a feed forward control mode, which is configured to pass along the rate of change of surface torque output ($dT_{TC}$) of the first axle which is calculated by the DTM subsystem; and configured to calculate and output a surface torque signal ($T_{TC}$) by augmenting the wheel slip feedback control mode and the feed forward control modes, wherein the augmentation is based on 1) a status of each wheel on the first axle that is calculated by the control deviation module and 2) a predetermined strategy given by a table, where $\dot{\omega}_A$ represents asymmetric dynamics:

$$\dot{w}_A = \dot{w}_L - \dot{w}_R = \frac{-T_{BL} + T_{BR} - T_{SL} + T_{SR}}{i_w} \qquad \text{Eq. 6}$$

| Wheel Status | Total Controller | | Asym. Controller | |
|---|---|---|---|---|
| | Feedback | DTM | Feedback | DTM |
| both wheels stable | Off | On | Off | On |
| both wheels slipping | On | Off | On | Off |
| one wheel stable | On | On | On or Off* | On |

*On: if for a formula for asymmetric dynamics of Eq. 6, $\dot{\omega}_A$ is controllable via ($-T_{BL} + T_{BR}$)
Off: if for a formula for asymmetric dynamics of Eq. 6, $\dot{\omega}_A$ is not controllable via ($-T_{BL} + T_{BR}$)

and where $T_{BL}$ represents brake torque for a left wheel of the wheel pair; and
  where $T_{BR}$ represents brake torque for a right wheel of the wheel pair.

14. The system of claim 10, wherein the first asymmetric controller of the CWC subsystem is further configured to include:
  a wheel slip feedback control mode, which is configured to apply a feedback control to a asymmetric control deviation of the first axle ($V_{Dev\_AC}$) which is calculated by the control deviation module;
  a feed forward control mode, which is configured to pass along the rate of change of surface torque output ($dT_{AC}$) of the first axle which is calculated by the DTM subsystem; and
  configured to calculate and output a torque signal ($T_{AC}$) by augmenting the wheel slip feedback control mode and the feed forward control modes, wherein the augmentation is based on 1) a status of each wheel on the first axle that is detected by the control deviation module and 2) a predetermined strategy given by a table, where $T_{BL}$ represents brake torque for a left wheel of the wheel pair, where $T_{BR}$ represents brake torque for a right wheel of the wheel pair, and where $\dot{\omega}_A$ is asymmetric dynamics:

| Wheel Status | Total Controller | | Asym. Controller | |
|---|---|---|---|---|
| | Feedback | DTM | Feedback | DTM |
| both wheels stable | Off | On | Off | On |
| both wheels slipping | On | Off | On | Off |
| one wheel stable | On | On | On or Off* | On |

*On: if for a formula for asymmetric dynamics of Eq. 6, $\dot{\omega}_A$ is controllable via ($-T_{BL} + T_{BR}$)
Off: if for a formula for asymmetric dynamics of Eq. 6, $\dot{\omega}_A$ is not controllable via ($-T_{BL} + T_{BR}$).

15. The system of claim 10, wherein the distributor subsystem is configured to calculate the drive torque target $T_D$ and brake torque targets ($T_{BL}$ and $T_{BR}$) for the first axle in response to the CWC subsystem's output signals ($T_{TC}$ and $T_{AC}$), in a manner such that the following equations are satisfied:

$$\begin{cases} T_{TC} = T_D - T_{BL} - T_{BR} \\ T_{AC} = -T_{BL} + T_{BR} \end{cases}.$$

16. The system of claim 10, for a second axle of the motor vehicle, further comprising:
   a second total controller operably associated with the second axle; and
   a second asymmetric controller operably associated with the second axle;
   both the second total controller and the second asymmetric controller configured identically to the first total controller and the first asymmetric controller, including having support from the control deviation module, the direct torque management subsystem, and the distributor subsystem.

17. A method for real time control of a pair of wheels associated with a first axle of a motor vehicle, wherein one of the pair of wheels is slipping, simultaneously and independently with real time explicit control of an acceleration of said motor vehicle provided by one wheel of the pair of wheels that is non-slipping and associated with the first axle, the method comprising:
   using a first total controller associated with the first axle of the vehicle to generate a torque signal output ($T_{TC}$);
   using a first asymmetric controller associated with the first axle to generate another torque signal output ($T_{AC}$) by detecting a real time operating condition of each said wheel which includes a wheel slip condition and a wheel non-slip condition, and
   augmenting the first total controller and a wheel slip feedback control mode and a feed forward control mode of the first asymmetric controller, the augmentation being based on the detected operating condition of each said wheel and a pre-defined table of conditions; and
   using a distributor subsystem used to generate a drive torque target $T_D$ and a brake torque target, the brake torque target being for a left wheel ($T_{BL}$) and for a right wheel $T_{BR}$) associated with the first axle, in response to the first total controller and torque signal outputs of the first asymmetric controller ($T_{TC}$ and $T_{AC}$), in a manner such that the following equations are satisfied:

$$\begin{cases} T_{TC} = T_D - T_{BL} - T_{BR} \\ T_{AC} = -T_{BL} + T_{BR} \end{cases}.$$

18. The method of claim 17, wherein the predefined table comprises Table 1 of FIG. 7 hereof.

19. The method of claim 17, further comprising using the direct torque management (DTM) subsystem to calculate, for use as inputs to the feed forward control modes of the first total controller and the first asymmetric controller, a rate of change of surface torque output ($dT_{TC}$) and a rate of change of torque output ($dT_{AC}$) from the first total controller and the first asymmetric controller, respectively by:
   using a DTM wheel control module to calculate the desired rate of change of a surface torque experienced by each wheel corresponding to a desired change of vehicle acceleration provided by each said wheel, whenever each said wheel is operating in a stable operating region and not experiencing wheel slip;
   using a DTM motion control handling module to calculate another desired change of a surface torque experienced by each wheel in response to torque commands of an external system on each said wheel, whenever each said wheel is operating in a stable operating region and not experiencing wheel slip;
   then using a DTM arbiter module to arbitrate outputs from the DTM wheel control module and DTM motion control handling module into a final rate of change of surface torque for each one of the wheels ($dT_{SL}$ and $dT_{SR}$) which is operating in a non-slipping operating region; and
   then applying a formula:

$$\begin{cases} T_{TC} = T_D - T_{BL} - T_{BR} \\ T_{AC} = -T_{BL} + T_{BR} \end{cases}.$$

* * * * *